United States Patent [19]

Bernard et al.

[11] Patent Number: 5,244,987
[45] Date of Patent: Sep. 14, 1993

[54] PROCESS FOR ALPHA-OLEFIN GAS-PHASE POLYMERIZATION CONTROLLED BY THE SIMULTANEOUS ADDITION OF AN ACTIVATOR AND AN ACTIVITY RETARDER TO THE POLYMERIZATION MEDIUM

[75] Inventors: Jean-Claude Bernard, Cabries; Claudine Berruyer, Lavera; Laszlo Havas, Martigues, all of France

[73] Assignee: BF Chemicals Limited, London, England

[21] Appl. No.: 844,986

[22] Filed: Feb. 28, 1992

Related U.S. Application Data

[63] Continuation of Ser. No. 451,101, Dec. 15, 1989, abandoned.

[30] Foreign Application Priority Data

Dec. 22, 1988 [FR] France .................................. 88 17551

[51] Int. Cl.$^5$ ............................................... C08F 2/40
[52] U.S. Cl. ........................................ 526/78; 526/82; 526/86; 526/185; 526/901
[58] Field of Search ...................... 526/78, 82, 138, 79, 526/83, 85, 86, 185, 901

[56] References Cited

U.S. PATENT DOCUMENTS

| 4,354,009 | 10/1982 | Goeke et al. | 526/125 |
| 4,387,202 | 6/1983 | Falbe et al. | 526/138 |
| 4,721,763 | 1/1988 | Bailly et al. | 526/125 |
| 4,855,370 | 8/1989 | Chirillo et al. | 526/138 |
| 4,956,426 | 9/1990 | Ardell et al. | 526/901 |

FOREIGN PATENT DOCUMENTS

| 170410 | 2/1986 | European Pat. Off. |
| 188914 | 7/1986 | European Pat. Off. |
| 868704 | 9/1981 | U.S.S.R. |
| 1249025 | 10/1984 | U.S.S.R. |

Primary Examiner—Joseph L. Schofer
Assistant Examiner—Tom Weber

[57] ABSTRACT

A process for controlling the continuous gas-phase polymerization of one or more alpha-olefins in a fluidized and/or mechanically stirred bed reactor using a high activity catalyst based on a transition metal of groups IV, V or VI of the Periodic Table comprises introducing into the reactor, continuously and simultaneously, an activity retarder and an activator, in very small amounts, in a molar ratio and at flow rates which are varied with time in order to maintain substantially constant either the polymerization rate or the transition metal content of the polymer produced.

37 Claims, No Drawings

PROCESS FOR ALPHA-OLEFIN GAS-PHASE POLYMERIZATION CONTROLLED BY THE SIMULTANEOUS ADDITION OF AN ACTIVATOR AND AN ACTIVITY RETARDER TO THE POLYMERIZATION MEDIUM

This application is a continuation of application Ser. No. 07/451,101, filed Dec. 15, 1989, now abandoned.

The present invention relates to a process for the alpha-olefin gas-phase polymerisation in a fluidized and/or mechanically agitated bed reactor, in the presence of a catalyst based on a transition metal.

It is known to polymerize continuously in the gas phase one or more alpha-olefins, such as ethylene or propylene, in a fluidized and/or mechanically agitated bed reactor, in the presence of a catalyst based on a transition metal belonging to groups IV, V or VI of the periodic table of the elements, in particular in the presence of a catalyst of the Ziegler-Natta type or a catalyst based on chromium oxide. The polymer particles in the process of forming are kept in the fluidized and/or agitated state in a gaseous reaction mixture containing the alpha-olefin or alpha-olefins to be polymerized, which are introduced continuously into the reactor. The catalyst is introduced continuously or intermittently into the reactor while the polymer constituting the fluidized and/or mechanically agitated bed is withdrawn from the reactor, also continuously or intermittently. The heat of the polymerization reaction is essentially removed by the gaseous reaction mixture, which passes through a heat transfer means before being recycled into the reactor.

When a process for the alpha-olefin gas-phase polymerisation is carried out in the presence of a catalyst of high activity, it has been observed that small variations in the course of the polymerization, resulting for example from slight fluctuations in the quality of the catalyst or of the alpha-olefins used in the reaction, can cause changes in the kinetic behaviour and the activity of the catalyst and of the active polymer particles forming the bed. These small variations are known to have particularly adverse effects in a gas phase polymerization process because of the fact that the heat exchange capacity of a gas phase is much lower than that of a liquid phase. In particular, they can cause an unexpected increase, which is difficult to predict, in the amount of heat evolved by the reaction. In general, this heat cannot be removed sufficiently rapidly and efficiently by the gaseous reaction mixture passing through the bed, and can give rise to the appearance of hot spots in the bed, as well as the formation of agglomerates of molten polymer. When hot spots appear in the bed, it is generally too late to prevent the formation of agglomerates. However, if the reaction conditions are corrected sufficiently early, especially by lowering the polymerization temperature or pressure, or by reducing the feeding rate of the catalyst into the reactor, in order to restrict the adverse effects of unexpected superactivation, the amount and size of the agglomerates formed can be reduced to a certain extent. During this period, however, it will not be possible to avoid a drop in the polymer production and a deterioration of the quality of the polymer manufactured. Consequently, if it is desired to avoid these disadvantages, the general polymerization conditions are usually chosen with a safety margin such that hot spots and agglomerates cannot form. Nevertheless, the application of such conditions unavoidably results either in a substantial loss of production, or in a deterioration of the quality of the polymer manufactured, especially an increase of the content of catalyst residues in the polymer.

These superactivation phenomena are likely to occur especially when using a high yield catalyst whose polymerization activity can vary considerably for very small variations in the proportion of impurities in the polymerization medium. This is the case in particular with catalyst of the Ziegler-Natta type based on magnesium, halogen and a transition metal such as titanium, vanadium or zirconium. Such superactivation phenomena can also develop when using comonomers which are capable of activating the polymerization of an alpha-olefin, especially in the case of the copolymerization of ethylene with alpha-olefins containing from 3 to 8 carbon atoms (Polymer Science USSR, vol. 22. 1980, pages 448–454).

It is also known, according to European patent applications no. 99 774 and no. 257 316, to polymerize propylene with the aid of a catalyst of the Ziegler-Natta type in a fluidized-bed reactor into which an organoaluminium compound, as a cocatalyst, and an aromatic ester, as a selectivity control agent, are introduced continuously at a constant rate and in a constant molar ratio with the catalyst. It is also possible to control the isotacticity of the polypropylene manufactured in this way by adjusting the ratio of the amounts of cocatalyst and selectivity agent introduced into the reactor, according to a model which correlates the isotacticity of the polymer with the productivity of the catalyst. However, this process and the model used does not enable the polymerisation rate, or the polymer production, or even the transition metal content in the polymer manufactured, to be kept constant, when the quality of the reactants, the activity of the catalyst or the supply of catalyst to the reactor fluctuate unpredictably during the polymerisation.

A process for a gas phase polymerization of alpha-olefin has now been found which makes it possible to overcome the above-mentioned disadvantages. In particular, the process makes it possible to manufacture polymers continuously, with a high productivity and a low content of catalyst residues, without supporting the usual consequences of unavoidable slight variations in the quality of the alpha-olefins or of the catalyst, or in the supply of catalyst to the reactor.

It is found that, by virtue of this process, it is now possible to produce continuously a polymer of a substantially constant and satisfactory quality, with a high degree of reproducibility and high yield, without forming agglomerates.

The present invention therefore relates to a process for a continuous gas phase polymerization of one or more alpha-olefins in a fluidized and/or mechanically agitated bed reactor, with the aid of a catalyst based on a transition metal belonging to groups IV, V or VI of the Periodic Table of the elements and in the presence of an activator and an activity retarder, characterized in that during the polymerization the activator and the activity retarder are introduced continuously and simultaneously into the reactor in very small amounts, in a molar ratio and at flow rates which are varied with time, so as to keep substantially constant either the polymerization rate or the content of transition metal in the polymer produced.

The activity retarder is selected from a wide variety of products which are preferably gases or volatile liquids under polymerization conditions and are capable of reducing the polymerization rate of an alpha-olefin in the presence of a catalyst based on a transition metal. The activity retarder can be selected especially from polymerization inhibitors or from the poisons known for this type of reaction. Activity retarders which can be selected in particular are carbon monoxide, carbon dioxide, carbon disulphide, carbon oxysulphide, nitrogen oxides and peroxides, oxygen, alcohols, aldehydes, ketones, thiols and water. The activity retarder can also be selected from electron donor compounds capable of complexing the catalyst and reducing the polymerization rate, in particular from organic compounds containing at least one oxygen, sulphur, nitrogen and/or phosphorus atom. It can be selected from a wide variety of electron donor compounds such as amines, amides, phosphines, sulphoxides, sulphones, esters, ethers or thioethers.

It is particularly recommended to use an activity retarder in an amount which is capable of reducing the polymerization rate without substantially affecting the qualities and the properties of the polymer manufactured, such as the melt index, the melt flow ratio, the average molecular weight, the molecular weight distribution or the isotacticity of the polymer. In fact, since it is the very principle of the present invention that the rate of introduction of the activity retarder into the reactor can vary with time, the properties of the polymer manufactured could vary considerably during the reaction if the amount of the activity retarder used had a substantial influence on the properties of the polymer. Such a result would be contrary to the object of the present invention. However, in view of the conditions under which the activity retarder is used in the present process, especially the very small amount introduced into the reactor, the choice of activity retarder can still be made from a large number of products such as polymerization inhibitors and electron donor compounds. It is possible to use the conventional polymerization poisons, preferably alcohols, carbon monoxide, carbon dioxide or oxygen, as well as electron donor compounds, preferably amides and aliphatic or cyclic ethers having not more than 10 carbon atoms. When the polymer manufactured is of a sterospecific nature, such as polypropylene, the activity retarder is preferably selected amongst the conventional polymerization poisons or inhibitors and amongst the electron donor compounds which are not considered as being a selectivity control agent, such as aromatic esters.

The activity retarder can be used in the pure state or, preferably, diluted in a gas such as nitrogen, or dissolved in a readily volatile liquid hydrocarbon. A further possibility is to use a mixture of two or more activity retarders.

The activator used according to the present invention is selected from a wide variety of products which are preferably gases or volatile liquids under polymerization conditions and are capable of increasing the polymerization rate of an alpha-olefin in the presence of a catalyst based on a transition metal. The activator can be selected from organometallic compounds of metals belonging to groups I, II or III of the periodic table of the elements, in particular from organoaluminium, organozinc or organomagnesium compounds. The use of organoaluminium compounds, in particular triethylaluminium, diethylaluminium chloride, tri-n-propylaluminium, tri-n-butyl-aluminium and triisobutylaluminium, is preferred.

The activator can be used in the pure state or preferably, diluted in a gas, or diluted or dissolved in a readily volatile liquid hydrocarbon. It is possible to use a mixture of two or more activating agents.

According to the present invention, it has been found that the activator and the activity retarder must be introduced into the polymerization reactor continuously and simultaneously. In practice, they are introduced into the reactor at the same time as the alpha-olefin(s), continuously or in an almost continuous, intermittent manner, so that the interruption time is so short that it cannot affect the polymerization rate which is substantially kept constant. If the introductions of the activator and of the activity retarder are interrupted, or if the interruption times are too long, the activity of the catalyst may change. The polymerization rate is no longer controlled and may change rapidly with the quality of the reactants and of the catalyst which may result in the production of agglomerates.

It has been found that the activator is introduced into the reactor in a very small amount such that the molar ratio of the amount of activator introduced to the amount of alpha-olefin or alpha-olefins introduced is $10^{-7}$ to $10^{-4}$, preferably $2 \times 10^{-7}$ to $5 \times 10^{-5}$. It is important for a minimum amount of activator to be constantly introduced into the reactor, i.e. to ensure a minimum rate of introduction of the activator into the reactor. The amount of the activator generally depends on the type of the gas phase polymerization system used and on the type of the catalyst used. The lowest amount of the activator to be used and consequently the minimum flow rate of the introduction of the activator into the reactor can be easily determined by the minimum value of the catalyst activity which is capable of giving the desired quality of the polymer to be produced. Furthermore, the highest amount of the activator to be used and hence the maximum flow rate of the introduction of the activator into the reactor can be directly determined by the maximum heat exchange of the gas phase polymerization system, or by the maximum polyolefin production, which does not induce the formation of agglomerates.

The activity retarder is also introduced into the polymerization reactor continuously, in an amount which is generally so small that it is not possible to measure the proportion of this retarder in the gaseous reaction mixture circulating in the reactor. In practice, the activity retarder is introduced into the reactor in an amount such that the molar ratio of the amount of activity retarder introduced to the amount of alpha-olefin or alpha-olefins introduced is $10^{-8}$ to $10^{-5}$, preferably $5 \times 10^{-8}$ to $2 \times 10^{-6}$. It has been found, surprisingly, that the continuous production of a polyolefin of a constant quality with a high productivity and a high degree of reproducibility without forming agglomerates, requires the introduction of a minimum amount of activity retarder into the reactor, i.e. it is necessary to ensure a minimum rate of introduction of the activity retarder into the reactor. This surprising result is observed especially when the process is carried out in large industrial reactors, where substantial volumes of gas are used during the polymerization.

The amount of the activity retarder generally depends on the type of the gas phase polymerization system used and on the type of the catalyst used. The lowest amount of the activity retarder to be used and consequently the minimum flow rate of the introduction of the activity retarder into the reactor can be easily determined by the maximum heat exchange of the gas phase polymerization system, or by the maximum polyolefin production which does not induce the formation of agglomerates. Furthermore, the highest amount of the activity retarder to be used and hence the maximum flow rate of the introduction of the activity retarder into the reactor can be directly determined by the highest value of the concentration of impurities which may be introduced by the gases and the reactants into the reactor, when the quality of the reactants fluctuates.

In particular, if the minimum rate of introduction of the activity retarder is too low, it has been observed that, during the polymerization, the polymer production can drop appreciably to a level such that the introduction of the activity retarder has to be stopped. In this case, the drop in production can become unavoidable and the content of catalyst residues in the polymer can increase significantly. Advantageously, this drawback is easily mitigated by virtue of the fact that the activator is introduced continuously into the reactor and that its rate of introduction can be increased.

It has also been found that if the rate of introduction of the activity retarder is too high, i.e. if the molar ratio of the amount of activity retarder introduced to the amount of alpha-olefin or alpha-olefins introduced is excessive, the polymer production falls, or the content of catalyst residues in the polymer can increase considerably. Moreover, an excessive amount of the activity retarder may produce a non-homogeneous gaseous reaction mixture and may lead to difficulty in controlling the polymerization rate.

According to the present invention, it has also been discovered that the molar ratio of the amounts of activator and activity retarder introduced, and also the rates of introduction of these two agents, have to be varied with time in order to keep the polymerization rate substantially constant when slight fluctuations occur in the quality of the reactants or of the catalyst, or in the supply of catalyst to the reactor. It is estimated that a polymerization rate is considered to be substantially constant with time when the amount of polyolefin produced per hour does not vary by more than 5% by weight, preferably by more than 3% by weight.

In another variant of the process, it has also been discovered that the rates of introduction of the activitor and activity retarder and the molar ratio of the amounts of the two agents introduced can be modified with time in order to keep substantially constant the content of transition metal in the polymer produced when the quality of the reactants or of the catalyst, or the supply of catalyst to the reactor, fluctuates during the polymerization. It is estimated that this content is considered to be substantially constant when the content by weight of transition metal in the polymer does not vary by more than 10%, preferably by more than 5%.

A gas phase polymerization process is generally carried out by maintaining substantially constant the operating conditions, such as the partial pressures of the main constituants of the gaseous reaction mixture, the total pressure, the catalyst feeding rate, the height or the weight of the fluidized bed, the polymerization temperature, the gas velocity and the polymer withdrawing rate. Under these circumstances, the polymerization rate can be easily determined, because it is directly related to the polymer production (i.e. to the polymer withdrawing rate), or to the alpha-olefin feeding rate, or to the difference between the inlet gas temperature and the exit gas temperature in the fluidized bed.

Thus, for example, when it is observed, during the polymerization, that the polyolefin production is tending to increase or that the content of transition metal in the polymer produced is tending to decrease, because of an unexpected drop in the impurities in the alpha-olefins or alpha-olefins introduced into the reactor, or because of using a new catalyst which is slightly more active than the previous one, or again because of a greater supply of catalyst to the reactor than was anticipated, the rate of introduction of the activity retarder is then increased so as to keep constant the polymerization rate, in particular the polymer production, or the content of transition metal in the polymer produced. If the rate of introduction is not varied or if this variation is too small, the adverse effects of superactivation will rapidly occur with the appearance of hot spots and agglomerates in the bed. If on the other hand, it is desired to avoid an excessive increase in the rate of introduction of the activity retarder, the amount of activator introduced can advantageously be reduced.

Conversely, when it is observed, during the polymerization, that the polyolefin production is tending to decrease or that the content of transition metal in the polymer produced is tending to increase, the rate of introduction of the activity retarder is then reduced so as to keep constant either the polymerization rate, in particular the polymer production, or the content of transition metal in the polymer produced. If the rate of introduction is not varied or if this variation is too small, the polymer production unavoidably falls and the content of transition metal in the polymer increases. If as a result of this variation in the rate of introduction, the amount of activity retarder introduced is reduced to its minimum level, it is then recommended to increase the rate of introduction of the activator to an appropriate value in order to keep constant the polymerization rate or the content of transition metal in the polymer produced.

It has been observed, surprisingly, that, by virtue of the process of the present invention, it is now possible to carry out a gas phase polymerization at higher temperatures and under higher alpha-olefin pressures than previously. One of the unexpected advantages of the process is that the polyolefin production can be increased by up to 25% and the risk of forming hot spots and agglomerates can be reduced substantially. By virtue of the continuous introduction of the activator and activity retarder in very small amounts varying with time, it is now possible to produce polyolefins of an excellent quality, with a high degree of reproducibility, despite substantial and unexpected variations in the quality of the reactants, in the activity of the catalyst, or in the supply of the catalyst to the reactor. It has been noticed, surprisingly, that the antagonistic effects of the activator and activity retarder on the polymerization rate are not exerted direct so as to cancel each other out, but so as to produce an overall effect which is different from that normally expected to be obtained simply by juxtaposition of their individual effects. It has actually been found that the effects produced by the two agents appear with a different intensity and with a time lag. More particularly, the effects produced by the activator appear slowly with time, whereas those produced by the activity retarder appear almost immediately. Thus the gas-phase polymerization of alpha-olefins can be controlled under improved conditions by combining the particular uses of these two agents. For example, the polymer production can be regulated firstly by roughly setting the rate of introduction of the activator and then by precisely and appropriately selecting the rate of introduction of the activity retarder, which makes it possible to achieve the desired level of production. When an unexpected variation occurs in the quality of the reactants or the catalyst, or in the supply of catalyst to the reactor, the polymerization rate can be kept constant firstly by modifying the rate of introduction of the activity retarder and then, if the effect of this first modification proves insufficient, by modifying the rate of introduction of the activator.

Another unexpected advantage of the present invention is that polyolefins thus manufactured have an appreciably reduced content of transition metal and, consequently, are of a superior quality, without forming agglomerates. Another advantage of the process arises from the fact that the control of the polymerization is not associated with measurement of the concentrations of activator and activity retarder in the polymerization medium, and that the polymer production can be regulated direct via the rates of introduction of the activity retarder, without substantially changing all the other operating conditions of the gas phase polymerization.

By virtue of this process, it is also possible to use very high yield catalysts whose polymerization activity generally is particularly sensitive to slight variations in the polymerization conditions. These catalysts can be introduced into the reactor continuously or intermittently. It is possible to use more active catalysts, in particular catalysts of the Ziegler-Natta type based on magnesium, halogen, titanium and/or vanadium and/or zirconium. It is also possible to increase the activity of these catalysts by the addition of greater amounts of a cacatalyst usually selected from organometallic compounds of metals belonging to groups I, II or III of the periodic table of the elements, in particular from organoaluminium, organozinc and organomagnesium compounds.

The cocatalyst can be identical to or different from the activator used in the present process. The Ziegler-Natta catalyst can be partially activated by the cocatalyst, prior to its introduction into the reactor. It is also possible to use a modifier agent with the Ziegler-Natta catalyst. The modifier agent can be a selectivity control agent, such as an electron donor compound, more particularly an aromatic ester or a silicon compound which is continuously introduced into the reactor, at a constant rate and in a constant molar ratio with the transition metal of the catalyst. The modifier agent can be identical to or different from the activity retarder used in the present process.

It is also possible to use a catalyst of high activity based on chromium oxide associated with a granular support based on a refractory oxide such as silica, alumina or aluminium silicate, and activated by a heat treatment at a temperature of at least 250° C. and at most the temperature at which the granular support may start to sinter, preferably a temperature of between 350° C. and 1000° C. The catalyst can be contacted with an organometallic compound prior to its introduction into the reactor. The organometallic compound has a metal belonging to groups I, II or III of the periodic table of the elements, and can be identical to or different from the activator used in the present process.

The catalyst of high activity can be used direct as such or in the form of a prepolymer. The conversion to prepolymer is generally carried out by bringing the catalyst into contact with the one or more alpha-olefins in amounts such that the prepolymer contains between 0.002 and 10 millimol of transition metal per gram. The catalysts can also be brought into contact with an organometallic compound of a metal belonging to groups I, II or III of the periodic table of the elements, in amounts such that the molar ratio of the amount of metal in the said organometallic compound to the amount of transition metal is between 0.1 and 50, preferably between 0.5 and 20. The organometallic compound can be identical to or different from the activator used in the present process. The catalyst of high activity, used direct or after a prepolymerization step, is introduced continuously or intermittently into the reactor.

The polymerization is carried out continuously in a fluidized and/or mechanically agitated bed reactor by techniques known per se and using equipment such as that described in French patent no. 2 207 145 or French patent no. 2 335 526. The process is particularly suitable for very large industrial reactors in which the least variation in the polymerization rate can very rapidly lead to adverse effects such as the formation of agglomerates. The gaseous reaction mixture containing the alpha-olefin(s) to be polymerized is generally cooled by means of at least one heat exchanger located outside the reactor, before being recycled via a recycling line. The activity retarder can be introduced direct into the reactor, preferably into a zone of the reactor where the activity retarder is dispersed rapidly, for example below a fluidization grid. It can also be introduced into the line for recycling the gaseous reaction mixture or into the line for supplying the reactor with alpha-olefins. If the recycling line includes a means for separating the gas from the fine solid particles entrained with this gas, such as a cyclone, and a means for recycling these fine particles direct into the polymerization reactor, the activity retarder can be introduced at any point on the gas/solid separation means or on the means for recycling the fine particles. It can preferably be introduced into the recycling line upstream from the heat exchanger. It can also be introduced into the catalyst feeding line. The activity retarder can advantageous be introduced at two or more points in the polymerization system.

The activitor is introduced separately from the activity retarder into the reactor. It can be introduced direct into the reactor, preferably into a zone of the reactor where the activator is dispersed rapidly, in particular below a fluidization grid. It can also be introduced into the line for recycling the gaseous reaction mixture, upstream or downstream of a heat exchanger. It can also be introduced into a line for supplying the reactor with a readily volatile liquid hydrocarbon or a liquid alpha-olefin.

The polymerization reaction is generally carried out under a pressure of 0.5 to 5 MPa and at a temperature of 0° to 135° C. The process is suitable for the polymerization of one or more alpha-olefins containing from 2 to 8 carbon atoms, in particular for the polymerization of ethylene or propylene. It is particularly suitable for the copolymerization of ethylene with at least one alpha-olefin containing from 3 to 8 carbon atoms, or for the copolymerization of propylene with at least one alpha-olefin containing from 4 to 8 carbon atoms, if appropriate with ethylene and/or a non-conjugated diene. The gaseous reaction mixture can contain hydrogen and an inert gas selected for example from nitrogen, methane, ethane, propane, butane, isobutane, pentaneisopentane or hexane. When a fluidized-bed reactor is used, the fluidization speed of the gaseous reaction mixture passing through the bed is 2 to 10 times the minimum fluidization speed. The polymer manufactured is withdrawn from the reactor continuously or, preferably, intermittently.

EXAMPLE 1

The process is carried out in a fluidized-bed reactor for gas-phase polymerization, consisting of a vertical cylinder of diameter 0.9 m and height 6 m and surmounted by a tranquillization chamber. The reactor is provided in its lower part with a fluidization grid and with an external line for recycling gas, which connects the top of the tranquillization chamber to the lower part of the reactor, at a point below the fluidization grid. The recycling line is equipped with a compressor for circulating gas and a heat transfer means. In particular the lines for supplying ethylene, but-1-ene, hydrogen and nitrogen, which represent the main constituents of the gaseous reaction mixture passing through the fluidized bed, come out into the recycling line.

Above the fluidization grid, the reactor contains a fluidized bed consisting of 400 kg of a linear low-density polyethylene powder made up of particles with a weight-average diameter of 0.7 mm. The gaseous reaction mixture, which contains 30% of ethylene, 12% of but-1-ene, 6% of hydrogen, 51% of nitrogen and 1% of ethane by volume, passes through the fluidized bed under a pressure of 1.6 mPa, at 80° C. and at an ascending fluidization speed of 0.5 m/s.

A catalyst identical to the one described described in Example 1 of French patent no. 2 405 961 is introduced intermittently into the reactor, the said catalyst containing magnesium, chlorine and titanium and having been converted beforehand to a prepolymer containing 40 g of polyethylene per millimol of titanium and an amount of tri-n-octylaluminium (TnOA) such that the molar ratio Al/Ti is equal to 1.10±0.05. The rate of introduction of the prepolymer into the reactor is 0.6 kg/h.

During the polymerization, a solution of dimethylformamide (DMF) in n-hexane, containing 0.004 mol of DMF per liter, is introduced continuously into the line for recycling the gaseous reaction mixture, at a point situated downstream of the heat transfer means. Simultaneously, a solution of triethylaluminium (TEA) in n-hexane, containing 0.1 mol of TEA per liter, is introduced continuously into the line for recycling the gaseous reaction mixture, at a point situated upstream and in the proximity of the heat transfer means. A copolymer of ethylene and but-1-ene, with a density equal to 0.918, is manufactured at a rate of 100±3 kg per hour.

This production is kept constant at this value throughout the polymerization by virtue of the DMF solution and TEA solution introduced, which are adjusted to mean rates of 210 ml/h and 330 ml/h, respectively, for the greater part of the polymerization time. No formation of agglomerates was observed over several days of continuous polymerization under these conditions. Furthermore, the copolymer manufactured in this way, containing about 7 parts per million of titanium by weight, has a constant quality despite the unpredictable fluctuations in the impurities brought by the constituents of the gaseous reaction mixture and despite the random variations in the activity of the prepolymer, in which the molar ratio Al/Ti fluctuates between about 1.05 and 1.15. Moreover, throughout the polymerization, it was noted that the proportions of carbon monoxide and carbon dioxide in the ethylene supplied to the reactor varied between about 0.01 and 0.05 part per million by volume (vpm) and between about 0.1 and 0.5 vpm, respectively. During the polymerization period in which the proportions of carbon monoxide and carbon dioxide were at their lowest, the rate of introduction of the DMF solution had to be increased to 300 ml/h in order to keep the copolymer production constant. Conversely, during the period in which the proportions of carbon monoxide and carbon dioxide were at their highest, the rate of introduction of the DMF solution had to be reduced to 80 ml/h in order to keep the copolymer production constant. It was also noted that, for a relatively short time, the proportions of carbon monoxide and carbon dioxide in the ethylene supplied to the reactor increased to 0.1 vpm and 1 vpm respectively. To keep the copolymer production constant, the rates of introduction of the DMF solution and TEA solution had to be set at 370 ml/h and 660 ml/h, respectively, during this period.

When the quality of the ethylene fluctuated during the polymerization, the molar ratio of the amount of DMF introduced to the amount of ethylene and but-1-ene introduced had to be modified within the range from $0.9 \times 10^{-7}$ to $4 \times 10^{-7}$ and the molar ratio of the amount of TEA introduced to the amount of ethylene and but-1-ene introduced had to be modified within the range from $0.9 \times 10^{-5}$ to $1.8 \times 10^{-5}$.

EXAMPLE 2

The process is performed under conditions which are exactly identical to those described in Example 1, except for the fact that instead of DMF, it is used tetrahydrofuran.

The copolymer of ethylene with but-1-ene is obtained in a way identical to that of Example 1.

EXAMPLE 3 (COMPARATIVE)

The process is performed under conditions which are exactly identical to those described in Example 1, except for the fact that no DMF solution and no TEA solution are introduced.

It is found very rapidly that the output of linear low density polyethylene varies with time in limits lower than 97 kg per hour and higher than 103 kg per hour, and that agglomerates of molten polymer are formed during the copolymerization.

We claim:

1. An improved process for producing a poly(alpha-olefin) with high yield and reproducibility and a substantial reduction of agglomerates in a continuous gas phase polymerization of one or more alpha-olefins in a fluidized and/or mechanically agitated bed reactor with the aid of a catalyst based on a transition metal belonging to Groups IV, V or VI of the Periodic Table of the elements and in the presence of an activator and an activity retarder, the improvement of the process characterized in that, during the polymerization, the activator and the activity retarder are introduced continuously and simultaneously into the reactor (i) in very small amounts without substantially affecting the quality and the properties of the polymer manufactured, and (ii) in a molar ratio and at flow rates both of which are varied with time in response to polymerization rate or transition metal content in the polymer manufactured, so as to keep substantially constant either the polymerization rate or the transition metal content of the polymer produced when the quality of catalyst and ingredients of the gas phase polymerization or the supply of catalyst to the reactor fluctuate during the polymerization.

2. The process according to claim 1, characterized in that the activity retarder is introduced into the reactor in an amount such that the molar ratio of the amount of activity retarder introduced to the amount of alpha-olefin or alpha-olefins introduced is $10^{-8}$ to $10^{-5}$.

3. The process according to claim 1, characterized in that the activator is introduced into the reactor in an amount such that the molar ratio of the amount of activator introduced to the amount of alpha-olefin or alpha-olefins introduced is $10^{-7}$ to $10^{-4}$.

4. The process according to claim 1, characterized in that the activity retarder is selected from polymerization inhibitors and electron donor compounds.

5. The process according to claim 4, characterized in that the polymerization inhibitor is selected from carbon monoxide, carbon dioxide, carbon disulphide, carbon oxysulphide, nitrogen oxides and peroxides, alcohols, thiols, aldehydes, ketones, oxygen and water.

6. The process according to claim 4, characterized in that the electron donor compound is selected from amines, amides, phosphines, sulphoxides, sulphones, esters, ethers and thioethers.

7. The process according to claim 1, characterized in that the activator is an organometallic compound of a metal belonging to groups I, II or III of the periodic table of the elements.

8. The process according to claim 7, characterized in that the organometallic compound is an organoaluminium, organozinc or organomagnesium compound.

9. The process according to claim 1, characterized in that the catalyst is a catalyst of the Ziegler-Natta type based on magnesium, halogen, titanium and/or vanadium and/or zirconium.

10. The process according to claim 1, characterized in that the catalyst is based on chromium oxide associated with a granular support based on a refractory oxide and activated by a heat treatment.

11. The process according to claim 1 wherein the activity retarder is introduced into the reactor in an amount such that the molar ratio of the amount of activity retarder introduced to the amount of alpha-olefin or alpha-olefins introduced is $10^{-8}$ to $10^{-5}$ and the activator introduced into the reactor is in an amount such that the molar ratio of the amount of activator introduced to the amount of alpha-olefin or alpha-olefins introduced is $10^{-7}$ to $10^{-4}$.

12. The process according to claim 11, wherein the amount of activity retarder is in said molar ratio of $5\times10^{-8}$ to $2\times10^{-6}$ and the amount of activator is in said molar ratio of $2\times10^{-7}$ to $5\times10^{-5}$.

13. The process according to claim 11, wherein the activity retarder is selected from polymerization inhibitors and electron donor compounds.

14. The process according to claim 13, wherein the polymerization inhibitor is selected from the group consisting of carbon monoxide, carbon dioxide, carbon disulphide, carbon oxysulphide, nitrogen oxides and peroxides, alcohols, thiols, aldehydes, ketones, oxygen and water.

15. The process according to claim 13, wherein the electron donor compound is selected from amines, amides, phosphines, sulphoxides, sulphones, esters, ethers, and thioethers.

16. The process according to claim 11 wherein the activator is an organometallic compound of a metal belonging to groups I, II, or III of the periodic table of the elements.

17. The process according to claim 16, wherein the organometallic compound is an organoaluminum, an organozinc or an organomagnesium compound.

18. The process according to claim 11 wherein the catalyst is a catalyst of the Ziegler-Natta type based on magnesium, halogen, titanium, and/or vanadium, and/or zirconium.

19. The process according to claim 12 wherein the catalyst is based on chromium oxide associated with a granular support based on a refractory oxide and activated by a heat treatment.

20. The process according to claim 1 wherein the alpha-olefin is ethylene or a mixture of ethylene and one or more alpha-olefins having three to eight carbon atoms.

21. The process according to claim 11, wherein the alpha-olefin is ethylene or a mixture of ethylene and one or more alpha-olefins having three to eight carbon atoms.

22. The process according to claim 11, wherein the activator is an organoaluminum, an organozinc, or an organomagnesium compound; and the catalyst is the Ziegler-Natta type based on magnesium, halogen, titanium, and/or vanadium, and/or zirconium.

23. The process according to claim 11, wherein the activator is an organoaluminum, an organozinc, oran organomagnesium compound; and the catalyst is based on chromium oxide associated with a granular support based on a refractory oxide and activated by a heat treatment.

24. The process according to claim 22, wherein the alpha-olefin is ethylene or a mixture of ethylene and one or more alpha-olefins having three to eight carbon atoms.

25. The process according to claim 23, wherein the alpha-olefin is ethylene or a mixture of ethylene and one or more alpha-olefins having three to eight carbon atoms.

26. The process according to claim 24, wherein the activity retarder is an electron donor compound selected from the group consisting of amines, amides, phosphines, sulphoxides, sulphones, esters, ethers and thioethers.

27. The process according to claim 25, wherein the activity retarder is an electron donor selected from the group consisting of amines, amides, phosphines, sulphoxides, sulphones, esters, ethers, and thioethers.

28. The process of claim 1, wherein the rate of introduction of the activity retarder is first varied, and then, if necessary, modifying the rate of introduction of the activator in order to maintain a substantially constant rate of polymerization or a substantially constant content of the transition metal in the polymer produced.

29. The process of claim 11, wherein the rate of introduction of the activity retarder is first varied, and then, if necessary, modifying the rate of introduction of the activator, in order to maintain a substantially constant rate of polymerization or a substantially constant content of the transition metal in the polymer produced.

30. A process according to claim 1 wherein said catalyst is introduced into the reactor in the form of a prepolymer.

31. The process according to claim 1 or claim 11, characterized in that the activity retarder used in a stereospecific alpha-olefin polymerization is selected from polymerization inhibitors and electron donor compounds which are not selectivity control agents.

32. The process according to claim 1 or claim 11, characterized in that the activity retarder is introduced directly into the reactor below a fluidization grid.

33. The process according to claim 1 or claim 11, characterized in that the activity retarder is introduced into a line for recycling the gaseous reaction mixture of the gas phase polymerization, or into a line for supplying the reactor with the alpha-olefin(s).

34. The process according to claim 33, characterized in that the activity retarder is introduced into the gaseous reaction mixture recycling line upstream from a heat exchanger.

35. The process according to claim 1 or claim 11, characterized in that the activity retarder is introduced into a means for separating solid particles from gas in the gas phase polymerization, or into a means for recycling said solid particles separated from gas into the reactor.

36. The process according to claim 1 or claim 11, characterized in that the activator is introduced directly into the reactor below a fluidization grid.

37. The process according to claim 1 or claim 11, characterized in that the activator is introduced into a line for recycling the gaseous reaction mixture of the gas phase polymerization, or into a line for supplying the reactor with a readily volatile liquid hydrocarbon or a liquid alpha-olefin.

* * * * *